(12) United States Patent
Iborra Valls

(10) Patent No.: US 11,408,518 B2
(45) Date of Patent: Aug. 9, 2022

(54) PIVOTING VALVE FOR REGULATING THE FLOW OF A FLUID AND PROCEDURE FOR REGULATING THE FLOW OF A FLUID

(71) Applicant: MECANIZADOS ESFERIMEC, S.L., Castellar del Vallès (ES)

(72) Inventor: Daniel Iborra Valls, Castellar del Vallès (ES)

(73) Assignee: Mecanizados Esferimec, S.L., Castellar del Valles (ES)

( * ) Notice: Subject to any disclaimer, the term of this patent is extended or adjusted under 35 U.S.C. 154(b) by 0 days.

(21) Appl. No.: 17/193,274

(22) Filed: Mar. 5, 2021

(65) Prior Publication Data

US 2021/0190213 A1    Jun. 24, 2021

Related U.S. Application Data

(63) Continuation of application No. PCT/ES2019/070587, filed on Sep. 4, 2019.

(30) Foreign Application Priority Data

Sep. 5, 2018  (ES) .................. ES201830869

(51) Int. Cl.
  *F16K 3/06*  (2006.01)
  *F16K 3/10*  (2006.01)
  (Continued)

(52) U.S. Cl.
  CPC ............. *F16K 3/06* (2013.01); *F16K 3/10* (2013.01); *F16K 31/53* (2013.01); *F17D 3/01* (2013.01)

(58) Field of Classification Search
  CPC ... F16K 3/06; F16K 3/10; F16K 31/53; F16K 51/02
  See application file for complete search history.

(56) References Cited

U.S. PATENT DOCUMENTS 1,727,677 A * 9/1929 Siebert, Jr. .............. F16K 3/205
                                                       138/94.3
2,125,253 A    7/1938 Bowland
                (Continued)

FOREIGN PATENT DOCUMENTS

DE           54557 C    12/1890
FR         404294 A    11/1909
                (Continued)

OTHER PUBLICATIONS

International Search Report and Written Opinion for PCT Application No. PCT/ES2019/070587; European Patent Office; Rijswijk, Netherlands; dated Jan. 17, 2020.

(Continued)

*Primary Examiner* — Marina A Tietjen
(74) *Attorney, Agent, or Firm* — Thomas E. Lees, LLC

(57) ABSTRACT

Pivoting valve to regulate the flow of a fluid that comprises: a body including an inlet hole and an outlet hole for the fluid flow path, a fluid flow path shutter element mounted pivotable on a rotary axis of the valve body to be able to rotate from an open position to a closed position of the fluid flow path, characterised in that it includes a tubular element to channel the flow of fluid inside the valve body, the tubular element being interposed between the inlet and outlet holes, and mounted linearly displaceable, in such a way that it can be moved from the outlet hole to the inlet hole when the shutter element is in an open position.

15 Claims, 15 Drawing Sheets

(51) Int. Cl.
*F16K 31/53* (2006.01)
*F17D 3/01* (2006.01)

(56) References Cited

U.S. PATENT DOCUMENTS

| | | | |
|---|---|---|---|
| 2,661,770 A | 12/1953 | Hookham | |
| 3,109,457 A * | 11/1963 | Oliveau | F16K 39/045 |
| | | | 137/625.18 |
| 3,145,969 A * | 8/1964 | Von Zweck | F16K 51/02 |
| | | | 251/172 |
| 3,557,822 A * | 1/1971 | Chronister | F16K 43/00 |
| | | | 137/315.32 |
| 3,665,953 A * | 5/1972 | Chronister | F16K 43/003 |
| | | | 137/246.22 |
| 3,799,188 A * | 3/1974 | Chronister | F16K 5/0621 |
| | | | 137/271 |
| 3,904,171 A * | 9/1975 | Chronister | F16K 31/528 |
| | | | 251/159 |
| 4,253,485 A * | 3/1981 | Legille | F16K 3/22 |
| | | | 137/315.16 |
| 4,679,768 A * | 7/1987 | Hardy | F16K 3/16 |
| | | | 251/159 |
| 4,901,977 A | 2/1990 | Hendrick | |
| 4,962,911 A * | 10/1990 | Soderberg | F16K 5/0605 |
| | | | 251/159 |
| 8,028,972 B2 * | 10/2011 | Iijima | C23C 14/081 |
| | | | 251/302 |
| 2005/0062007 A1 * | 3/2005 | Fischer | F16K 3/34 |
| | | | 251/212 |
| 2010/0327203 A1 | 12/2010 | Nagai et al. | |
| 2016/0033047 A1 * | 2/2016 | Seo | F16K 3/06 |
| | | | 137/487.5 |
| 2020/0256470 A1 * | 8/2020 | Kim | F16K 27/04 |

FOREIGN PATENT DOCUMENTS

| | | | | |
|---|---|---|---|---|
| FR | 979852 A | 5/1951 | | |
| GB | 191086 | 12/1922 | | |
| GB | 679209 A * | 9/1952 | | F16K 3/312 |
| GB | 1328126 | 8/1973 | | |
| WO | 2006/046796 A1 | 5/2006 | | |
| WO | 2007/142395 A1 | 12/2007 | | |
| WO | 2008/080197 A2 | 7/2008 | | |
| WO | 2015/070338 A1 | 5/2015 | | |

OTHER PUBLICATIONS

Spanish Search Report for Spanish Patent Application No. 201830869; Spanish Patent Office; dated Jun. 7, 2019.

* cited by examiner

PIVOTING VALVE FOR REGULATING THE FLOW OF A FLUID AND PROCEDURE FOR REGULATING THE FLOW OF A FLUID

CROSS REFERENCE TO RELATED APPLICATIONS

This is a Continuation application of International Application No. PCT/ES2019/070587, filed on Sep. 4, 2019, which claims the benefit of Spanish Patent Application No. P201830869, filed on Sep. 5, 2018, the disclosures of which are hereby incorporated by reference herein.

BACKGROUND

The present invention refers to a pivoting valve for regulating the flow of a fluid. It also refers to a procedure for regulating the flow of a fluid by means of the valve object of invention.

Pressure loss problems caused by the different elements of a fluid installation, such as valves, sudden widening and narrowing, elbows or "T" type connections, among others, are known in the state of the art. These pressure losses must be considered during the design phase of the installation, affecting the dimensioning of the hydraulic pumps.

Valves in fluid installations usually have a shutter element that can be fully or partially open to regulate the fluid flow, causing variable pressure losses. In the state of the art, valves of different types such as butterfly valves, plug valves, check valves, or poppet valves, etc. are known. This type of valve has the disadvantage that, in an open position, the shutter is arranged in the flow path of the fluid flow, thus creating significant pressure losses. In addition, when the shutter element is exposed to the flow of the fluid, it must be designed in such a way that it is capable of resisting the forces exerted by said fluid, sometimes causing an oversized valve shutter element.

In the state of the art are known valves where the shutter element is located out of the flow of fluid, positioned in a cavity of the valve body, thus the hole is free of obstacles. This type of valve has the disadvantage that the circulating fluid can be introduced into the cavity of the valve body, creating turbulence that increases pressure losses. Likewise, the fluid can accumulate in the aforementioned cavity, making it difficult to accommodate the shutter element, also creating turbulences that in turn cause pressure losses in the fluid flow. An example of such valves are pivot valves used in gas installations or for fluids circulating at low pressure.

In these pivot valves, the shutter element is eccentrically articulated and moves from an open position to a ed position, and vice versa, to allow or prevent the flow of fluid through the valve. These pivot valves have the disadvantages mentioned above, and also the disadvantage that the chance of the rotation of an actuating element is high due to the friction that occurs between the shutter element and the inner surface of the valve body.

BRIEF SUMMARY

The objective of the present invention is to solve the inconveniences mentioned by developing a pivoting valve and a procedure to regulate the flow of a fluid by means of said valve which presents the advantages described below.

Preferably, the valve is suitable for a liquid fluid, e.g. water, oil, gasoline, diesel, kerosene, pentane, hexane, heptane, cyclohexane or methylcyclohexane. However, the fluid circulating within the valve can also be a gaseous fluid, e.g. natural gas, methane, propane, butane, ethylene, propylene, butylene, butadiene or ethanol. Thus, the valve can be used in installations for both liquid and gaseous fluids.

In accordance with this objective, according to a first embodiment, the present invention refers to a pivoting valve comprising a body including; an inlet hole and an outlet hole for the fluid flow passage, and a shutter element of the fluid flow passage mounted pivotable on a rotating axis of the valve body to be able to rotate from an open position to a closed position of the fluid flow path. This valve is characterised by the fact that it comprises a tubular element to channel the flow of fluid within the valve body, the tubular element being interposed between this inlet hole and this fluid flow outlet hole, and mounted linearly displaceable so that it can be moved from the outlet hole to the inlet hole when the shutter element is in an open position.

The present invention has the advantage of including a tubular element which is mounted on the inside of the body and can be moved from the outlet hole to the inlet hole when the shutter element is not in a closed position. In this way it is possible to channel the fluid flow from the inlet hole to the outlet hole without creating excessive pressure losses during the passage of the fluid flow caused by the interference of a shutter element.

In addition, the tubular element prevents the flow of fluid, which flows through the valve, from entering the cavity where the shutter element is housed when in a normal open position.

The result is a valve for regulating a fluid flow of reduced dimensions, compact and easy to use, in which high fluid pressure losses are reduced. In addition, the service life of the valve is extended and maintenance work is reduced.

The valve, which is the object of the invention, is particularly suitable for fluids with a high viscosity, a characteristic that causes the fluid to suffer high pressure losses when circulating in installations where, for example, it must be processed. In the same way, this valve is suitable for fluid installations with working pressure between lower atmospheric pressure and 7500000 Pa. Surprisingly, this valve is also suitable for gaseous fluid installations, giving it versatility to be used in any type of fluid installation.

In accordance with the same objective, according to a second embodiment, the present invention refers to a procedure to regulate the flow of a fluid, by means of the valve claimed which comprises the stages of:
  a) moving of a tubular element from a working position in which it contacts a shutter element when in a closed position to a resting position in which it is housed in the cavity of the second portion of the valve body.
  b) moving of a shutter element from a closed position to an open position to allow fluid flow through the valve from an inlet hole to an outlet hole,
  c) moving of a tubular element from a resting position in which it is housed in the cavity of the second portion of the valve body to a working position in which it comes into contact with the first portion of the valve body when the shutter element is in an open position,
  d) maintaining of the tubular element for a predetermined time by allowing fluid flow through the valve from the inlet hole to the outlet hole; and
  e) moving of the tubular element from a working position in which it comes into contact with the first portion of the body when the shutter element is in an open position to a resting position in which it is housed in the cavity of the second portion of the body.

Following are described some embodiments of the device and procedure according to the dependent claims described below.

According to a preferred embodiment, the body includes a first portion of the body provided with a cavity defining an inlet hole, a second portion of the body provided with a cavity defining an outlet hole and a tubular element to channel the flow of fluid mounted linearly displaceable within the body from a resting position in which it is housed in the cavity of the second portion of the body to a working position in which it comes into contact with the first portion of the body when the shutter element is in an open position. Thus, the tubular element is located inside the body between the inlet and outlet holes. In addition, the displacement of the tubular element allows it to be placed in a separate resting position from the shutter element, to facilitate the movement from a closed position to an open position.

Preferably, both the tubular element and the inlet and outlet holes have a circular section and matching and aligned fluid flow dimensions. However, this section can be square, rectangular, triangular or of any other geometric shape, always maintaining the same dimensions of fluid passage between these elements and always being aligned with each other.

According to a preferred embodiment, the valve object of invention comprises a means for actuating the displacement of the tubular element inside the body comprising a mechanism provided with a first actuating element, capable of being actuated from the outside of the body, said mechanism including a means for transmitting the movement of the first actuating element to the tubular element which is housed inside the body. In this way, the first actuating element transmits the displacement to the tubular element in such a way that it moves linearly through the interior of the valve body until it is in a position adapted to the demands of the installation. These means of actuating the displacement can, for example, be controlled from a control box located on the outside of the valve body.

Advantageously, the first actuating element is rotary and the transmission means include a gear associated with the first actuating element and a rack attached to the tubular element and arranged in a groove provided on a surface of the tubular element; the tubular element being susceptible to be displaced when the gear is actuated. In this way, the tubular element moves linearly when the movement of the first actuating element is transformed into a linear movement by means of the gear associated with the first actuating element and the rack attached to the tubular element. This type of mechanism allows the tubular element to be kept in the desired position, without being displaced by the flow of fluid and the forces exerted by it.

Optionally, the groove in the tubular element has a groove or protrusion along the groove to ensure linear movement of the tubular element inside the valve body. In the same way, this indentation or protrusion can also be located on an opposite surface of the tubular element for greater efficiency in guiding the displacement of this tubular element.

According to a preferred embodiment, the tubular element is mounted in a position that can be moved from a resting position in which it is housed in the cavity of the second portion of the body to a working position in which it comes into contact with the shutter element when it is in a closed position. This ensures contact of the shutter element with the first portion of the body, thus effectively blocking the flow of fluid. In addition, the force exerted on the element blocked by the pressure of the fluid flow is prevented from displacing it, causing the fluid to filter to the outlet hole.

Preferably, the valve object of invention also comprises a means of displacement of the shutter element which includes a mechanism provided in a second actuator element capable of being operated from outside the body of the valve, and a means of transmitting the movement of the second actuator element to the rotating axis of the shutter element. In this way, the movement, e.g. rotary, of the second actuating element is transmitted to the rotating axis of the shutter element to move it from a closed position to an open position, and vice versa. These means of displacement can be, for example, controlled from a control box located on the outside of the valve body.

Advantageously, the second actuating element is rotary and the transmission means include a gear associated with the second actuating element and a screw attached to the rotation shaft, the shutter element being able to be displaced when said gear is activated. In this way, the gear associated with the second actuating element moves the screw connected to the rotation shaft that transmits the movement to the shutter element to move it from an open position to a closed position depending on the needs of the installation. The displacement of the shutter element is both rotational and longitudinal.

Optionally, such means of displacement of the shutter element include a spring at one end of the rotation shaft susceptible to be pressed against a surface of the first portion of the valve body, when said tubular element is located in a working position, the same spring being susceptible to linearly move the shutter element on the rotation shaft when the blocking pressure of the tubular element ceases. In this way, this spring moves the shutter element linearly away from the surface of the inlet hole, so that when the shutter element rotates there is no friction between it and the surface of the first portion of the valve body. Likewise, the torque to be exerted by the rotating shaft of the shutter element must be lower.

Depending on a preferred embodiment, the first and/or second portion of the body is provided with a groove in an inner wall that defines a cavity to house an element that ensures the watertightness of the valve body. In this way, the flow of fluid circulating inside the valve is prevented from leaking to the outside, causing undesirable situations for the correct operation of the installation or situations of risk that may affect living beings or objects in the immediate vicinity of the installation.

Optionally, other components of the valve, such as, for example, the rotation shaft, the shutter element, the tubular element or the first and/or second actuating element may have anti-flow elements to ensure that the flow of fluid does not filter to the outside of the valve, providing security against risk or undesirable situations in the installation. Such anti-leakage elements can be, for example, an O-ring, a graphite gasket or a thermoplastic gasket, among others.

Preferably, an outer wall of such first and/or second portion of the valve body defines an outer stretch of conduit for attaching a flange. In this way, the flange can be used to connect the valve more easily to an installation line.

Optionally, the outer wall of this first and/or second portion of the valve body may include a plurality of holes on its surface to join a flange by means of e.g. screws.

As mentioned above, the pivoting valve object of invention may comprise a control box located on the outside to govern the means of displacement of the shutter element and the means of actuating the displacement of the tubular element by means of a first actuating element, depending on the needs of the installation. This control box may also receive external signals to govern the valve. In the same way, this valve will be equipped with a safety system that will be activated in case of need that will position the shutter element in a closed position and the tubular element in a working position in contact with this shutter element.

According to an embodiment, the means of displacement include a dragging sleeve arranged concentric and attached to the rotating shaft, where the shutter element is mounted attached to the dragging sleeve being able to displace the shutter element when the second actuating element is actuated, and where the tubular element is mounted displaceable linearly with respect to the dragging sleeve, the tubular element being able to be displaced when the first actuating element is actuated.

Thus, turning the rotating shaft displaces the shutter element, but not the tubular element. The tubular element can be moved linearly by actuating the first actuating element and the shutter element can be moved linearly by mounting both on the dragging sleeve.

Depending on the application, the fluid flow can be directed from the outlet hole to the inlet hole or vice versa.

Thus, when the fluid flow is directed from the outlet hole to the inlet hole, the tubular element displaces the shutter element, in such a way that the pressure exerted by the fluid flow does not keep the shutter element in contact with the first portion of the body.

Preferably, the dragging sleeve includes a protrusion designed to contact a joining portion of the tubular element when the first actuating element is actuated, where the protrusion is configured to cooperate with an elastic element to linearly displace said shutter element when linearly displacing the tubular element from a working position in which it comes into contact with the first body portion or with the shutter element when it is in a closed position of the fluid flow, to a resting position in which it is housed in the cavity of the second body portion.

Optionally, the shutter element includes a centring mechanism that includes a positioning disc and elastic elements, the elastic elements being mounted, joined by a distal end to said shutter element and by the distal end opposite the positioning disk, and capable of moving the positioning disk on a plane defined by the surface of the shutter element in order to come into contact with the first portion of the body.

In this way, the shutter element comprises a positioning disk that is capable of moving over a plane to be completely aligned with the defined inlet hole in the cavity of the first portion of the body and avoid leaks of the fluid flow.

Advantageously, the positioning disk comprises a contact surface intended for contact with a complementary contact surface arranged in the first portion of the body, where the complementary contact surface of the first portion of the body includes grooves arranged to accommodate sealing gaskets.

In this way, the positioning disk of the shutter element makes it possible to contact an additional contact surface to prevent fluid flow leaks when the shutter element is in a closed position. In addition, the sealing gaskets arranged in the grooves of this complementary contact surface, and the contact of the contact surface with the complementary contact surface provide the sealing valve for low pressure fluids, high pressure fluid sealing and a metal-to-metal seal against fire.

Optionally, the tubular element comprises a contact surface intended for contact with a complementary contact surface arranged in the first portion of the body, where the complementary contact surface of the first portion of the body includes grooves arranged to accommodate sealing gaskets.

In this way, the contact surface provided in the tubular element allows contact with a complementary contact surface to avoid fluid flow leaks when the tubular element is in a position where it comes into contact with the first portion of the body. In addition, the sealing gaskets arranged in the grooves of this complementary contact surface, and the contact of the contact surface with the complementary contact surface provide the sealing valve for low pressure fluids, high pressure fluid sealing and a metal-to-metal seal against fire.

Preferably, the sealing gaskets arranged in the grooves of the complementary contact surface can be, for example, rubber, silicone, soft metal, cork, felt, fibreglass, a plastic polymer or contain asbestos.

With reference to the procedure, preferably after stage e) a stage f) of displacement of the obturator element from an open position to a closed position is carried out to block the flow of fluid inside the valve from the inlet orifice to the outlet orifice. In this way, the displacement of the shutter element interrupts the flow of fluid from the inlet hole to the outlet hole.

Advantageously, after stage f) a stage g) of displacement of the tubular element from a resting position to a working position in which it comes into contact with the shutter element to ensure blockage of the flow of fluid from the inlet hole to the outlet hole. In this way, the tubular element presses the shutter element against a surface of the first portion of the body, specifically in the vicinity of the inlet hole, to prevent its displacement due to the forces exerted by the pressure of this fluid flow and to ensure that it does not leak into the outlet hole. Also, in a preferred embodiment, the tubular element and a control box that governs the movements of the valve elements create a blocking system that prevents the shutter element from moving, ensuring that the shutter element remains in the closed position and with the tubular element pressing it in the event of malfunction or emergency.

Preferably, after stage a) a stage a') of displacement of the shutter element from a closed position to an intermediate open position in which it does not come into contact with the first portion of the body is carried out. In this way, the tubular element displaces the shutter element so that the latter does not make contact with the first portion of the body, avoiding friction with it and facilitating its displacement from a closed position to an open position.

BRIEF DESCRIPTION OF THE SEVERAL VIEWS OF THE DRAWINGS

In order to better understand the description made, a set of drawings has been provided which, schematically and solely by way of non-limiting example, represent a practical case of embodiment.

DETAILED DESCRIPTION

Figure 1:
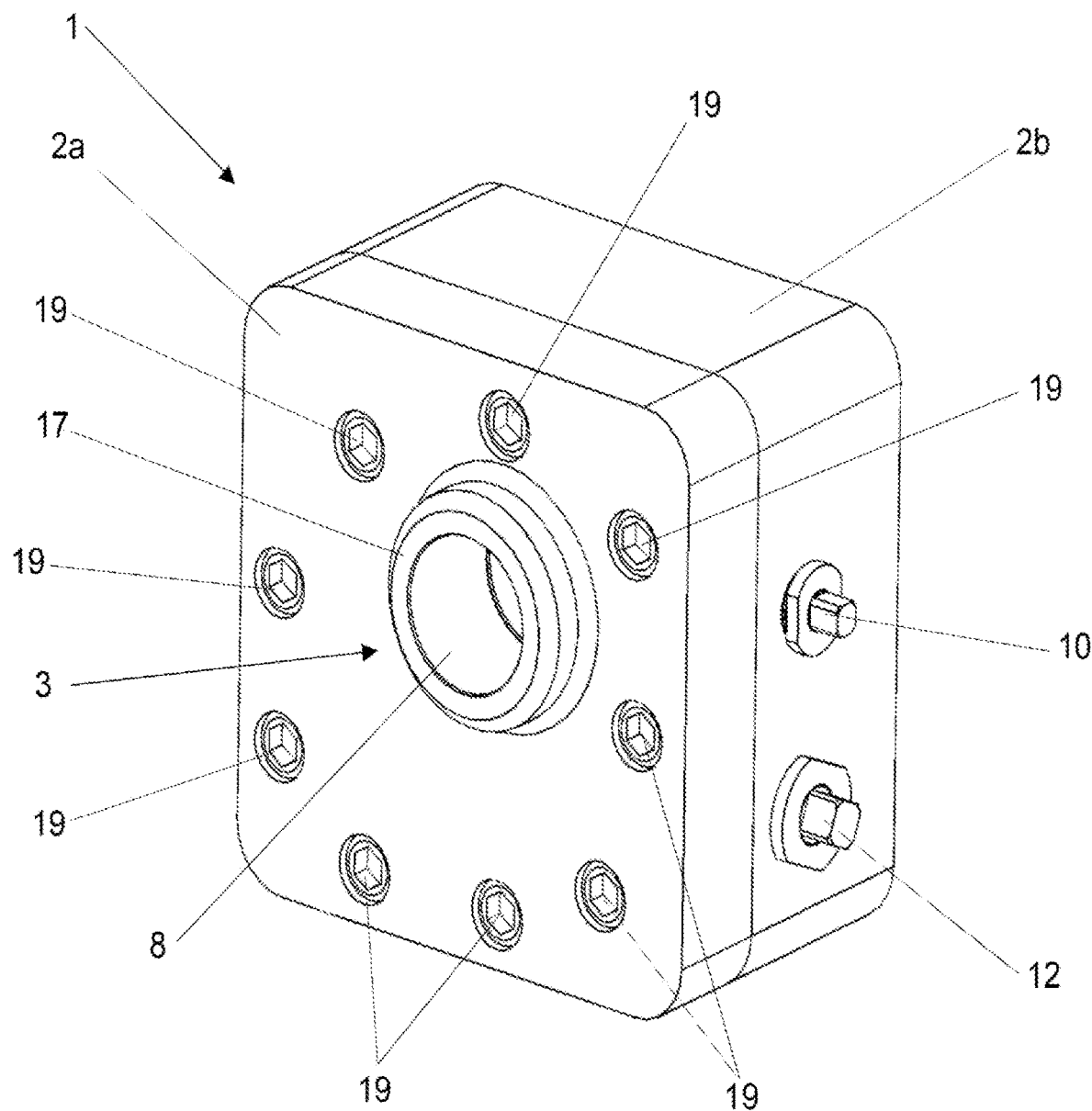
FIG. 1 shows a perspective view of the valve object of invention for an example of embodiment.
Figure 2:
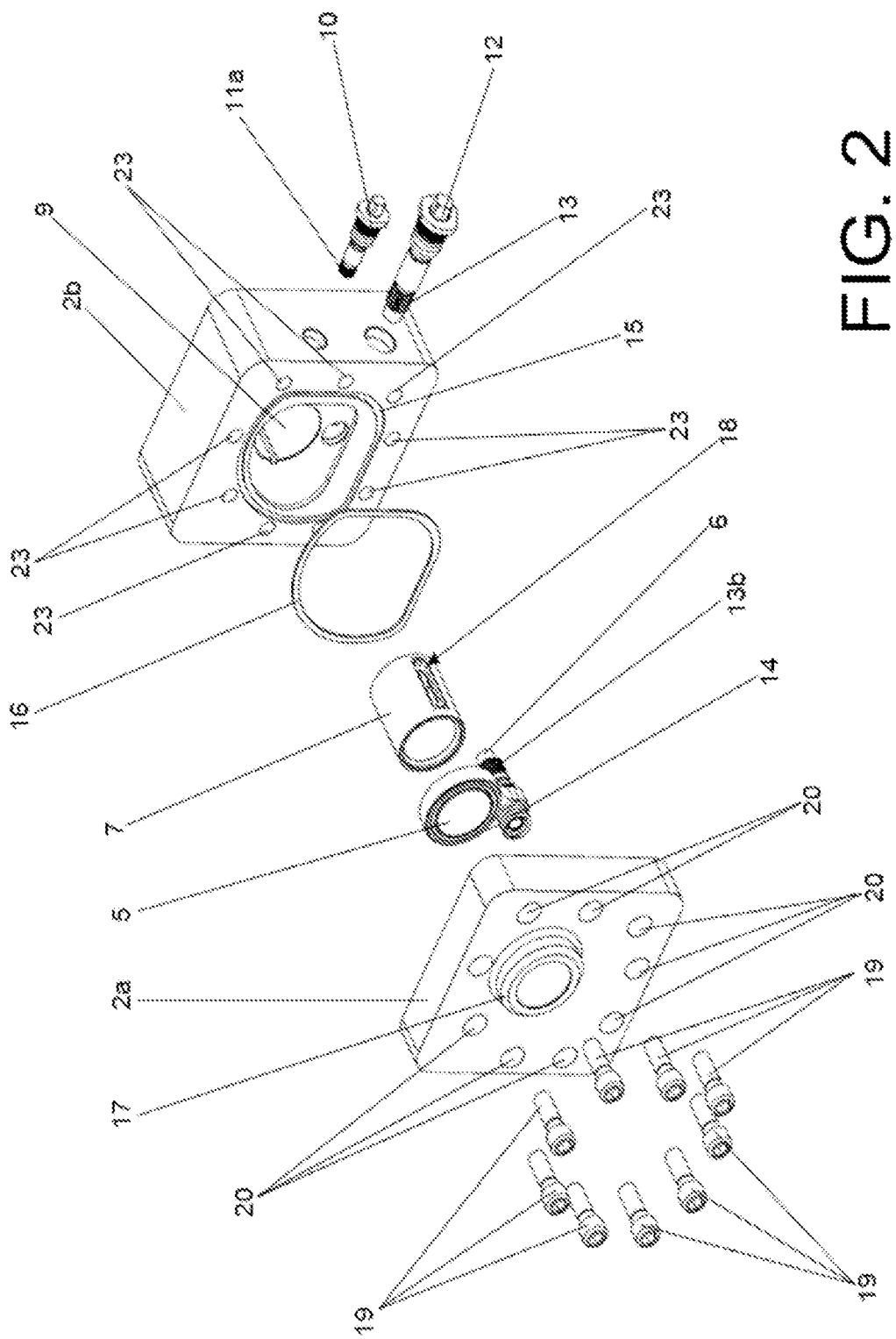
FIG. 2 shows an exploded perspective view of the valve object of invention, for the same example of embodiment as FIG. 1.
Figure 3:
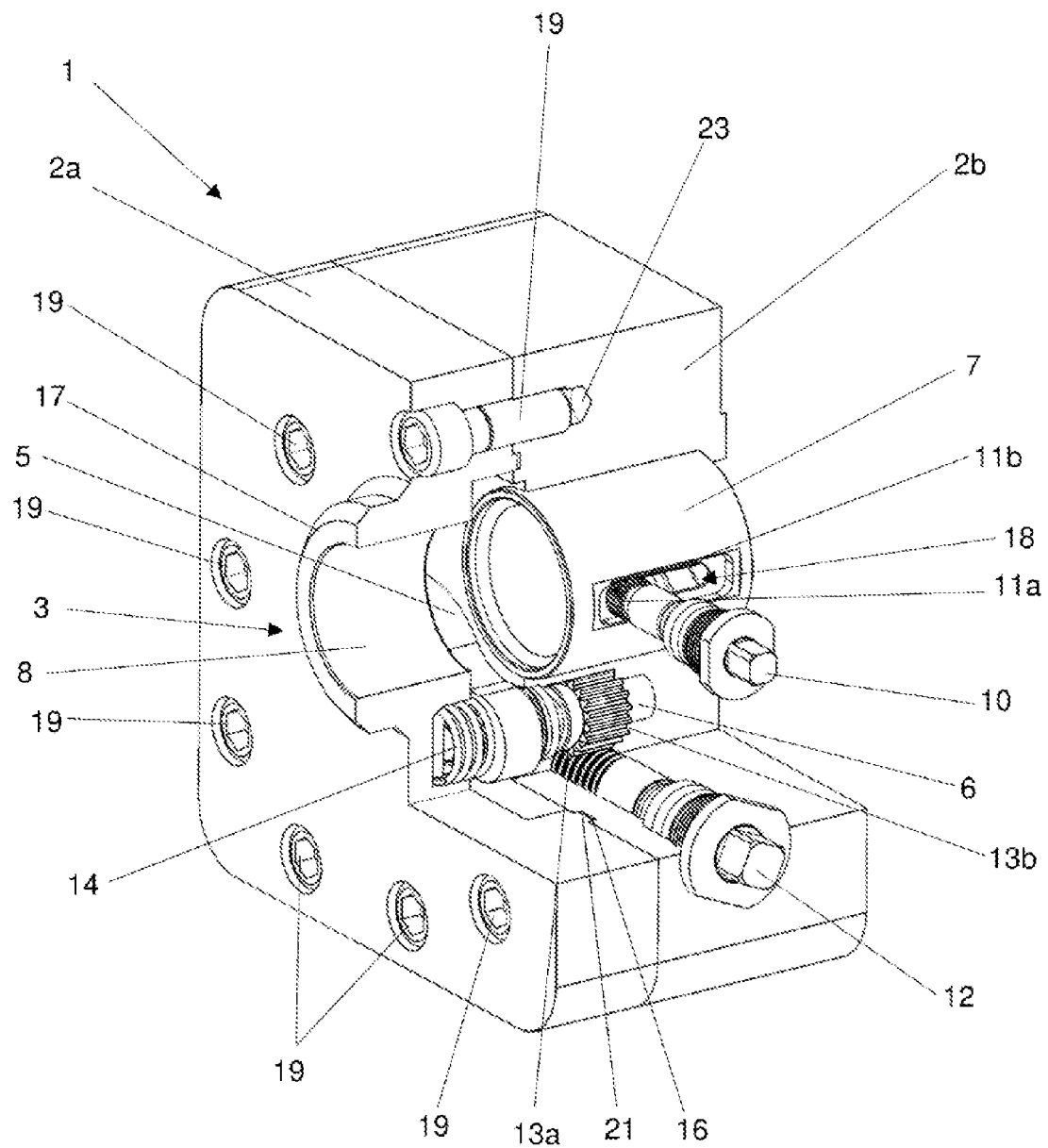
FIG. 3 shows a sectioned perspective view of the front of the valve object of invention, when the shutter element is in an open position, for the same example of embodiment of the previous figures.
Figure 4:
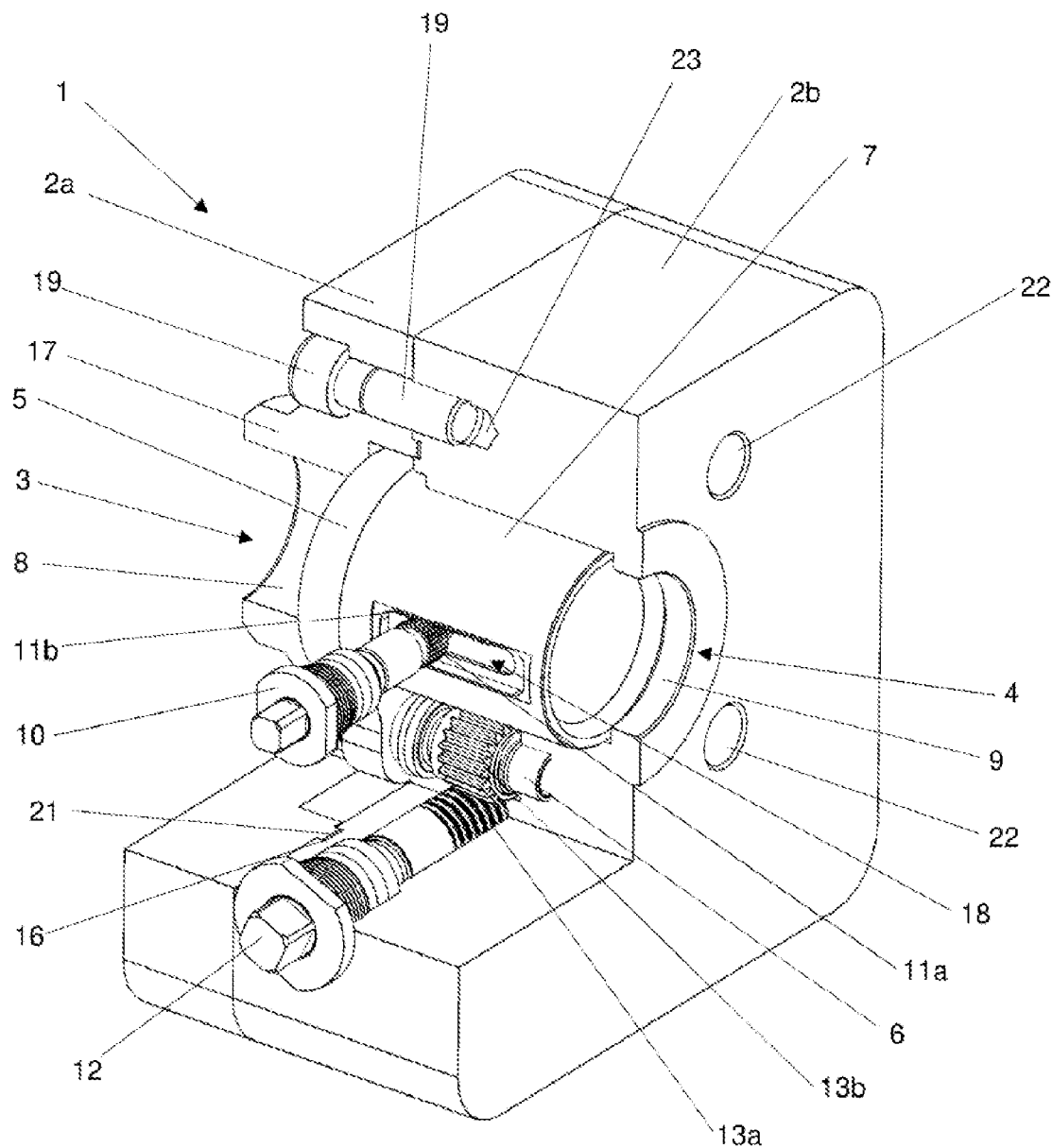
FIG. 4 shows a sectioned perspective view of the back of the valve object of invention when, the shutter element is in a closed position and the tubular element is in a working position where it contacts with a surface of the shutter element, for the same example of embodiment of the previous figures.
Figure 5:
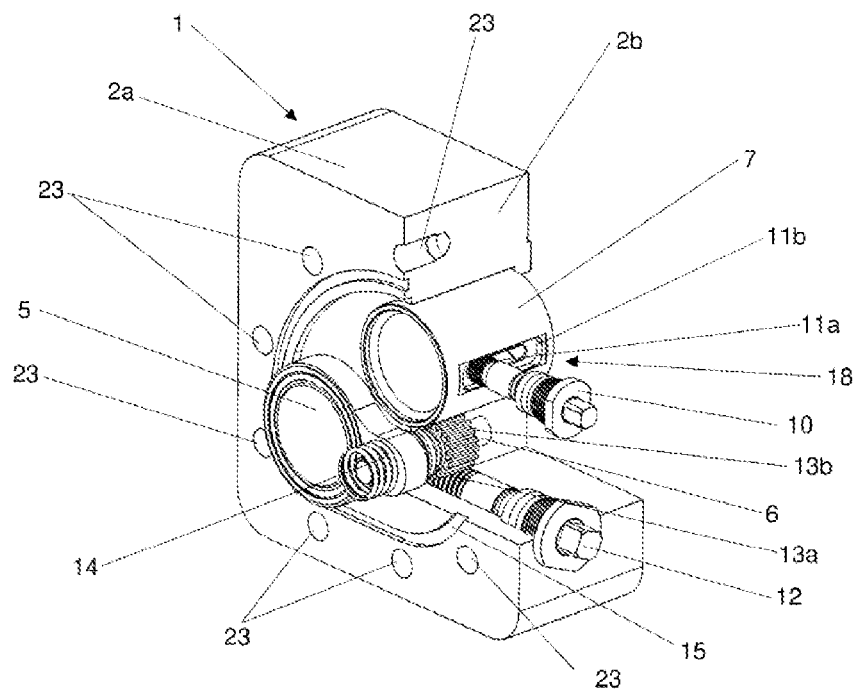
FIG. 5 shows a sectioned perspective view of the front of the valve object of invention, when the shutter element is in an open position and the tubular element in a resting position, for the same example of embodiment of the previous figures. For clarity reasons, the first portion of the valve body has not been represented in FIG. 5.
Figure 6:
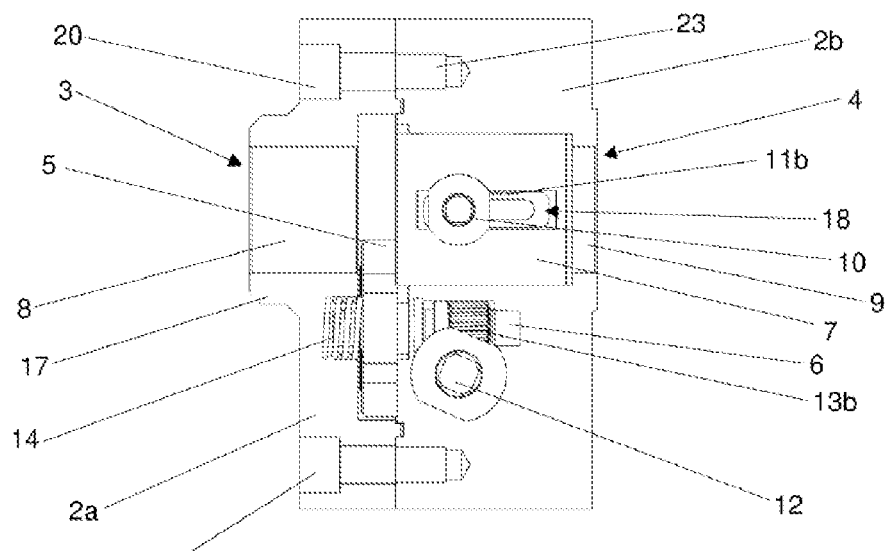
FIG. 6 shows a sectioned view of the valve object of invention, when the shutter element is in an open position and the tubular element in a resting position, for the same example of embodiment of the previous figures.
Figure 7:
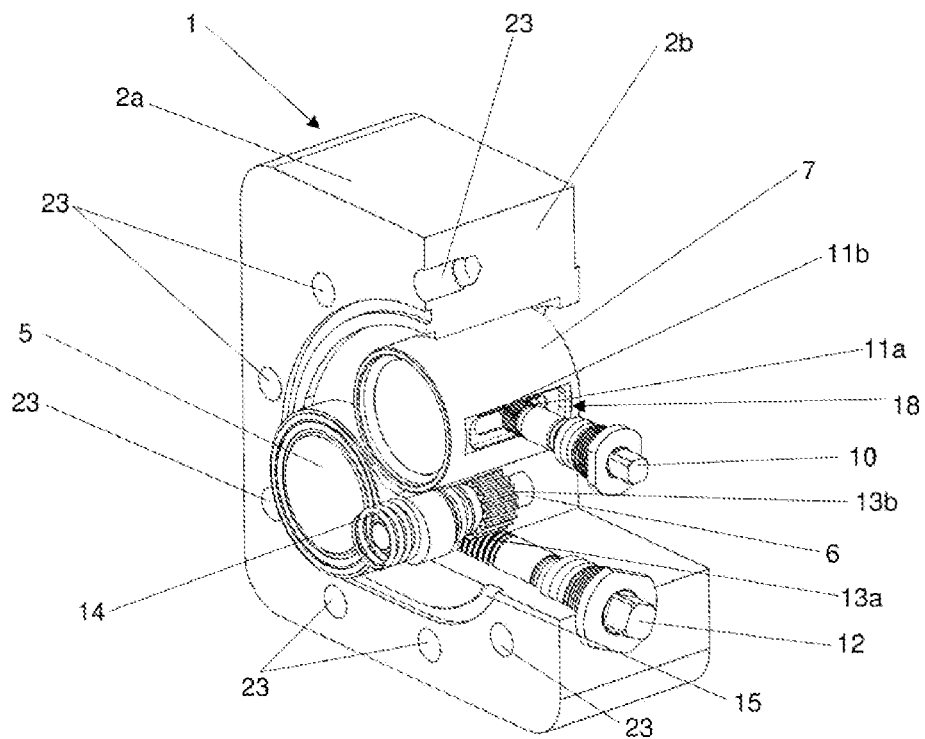
FIG. 7 shows a sectioned view in perspective of the front of the valve object of invention, when the shutter element is in an open position and the tubular element in a working position in contact with a surface of the first portion of the valve body, for the same example of embodiment of the previous figures. For clarity reasons, the first portion of the valve body has not been represented in FIG. 7.
Figure 8:
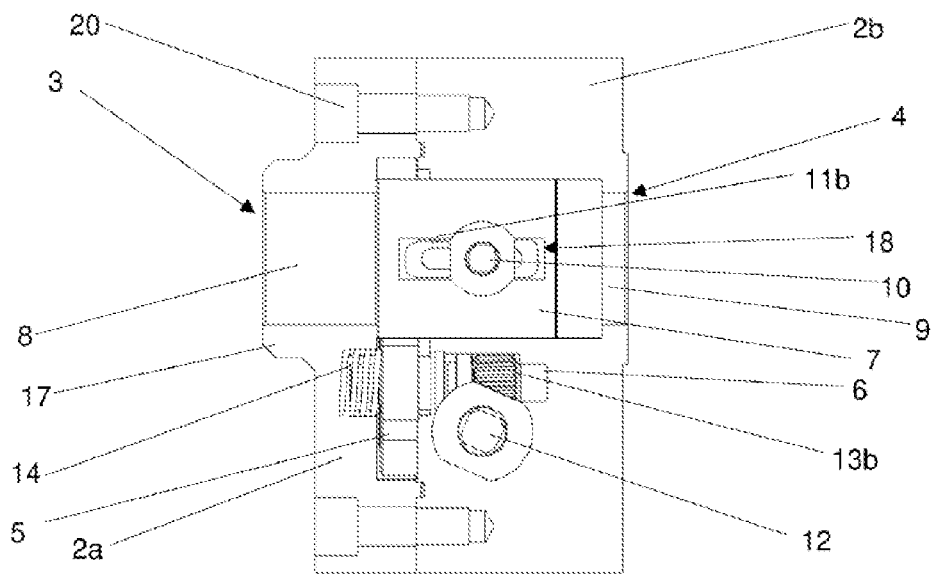
FIG. 8 shows a sectioned view of the valve object of invention, when the shutter element is in an open position and the tubular element in a working position in contact with a surface of the first portion of the valve body, for the same example of embodiment of the previous figures.
Figure 9:
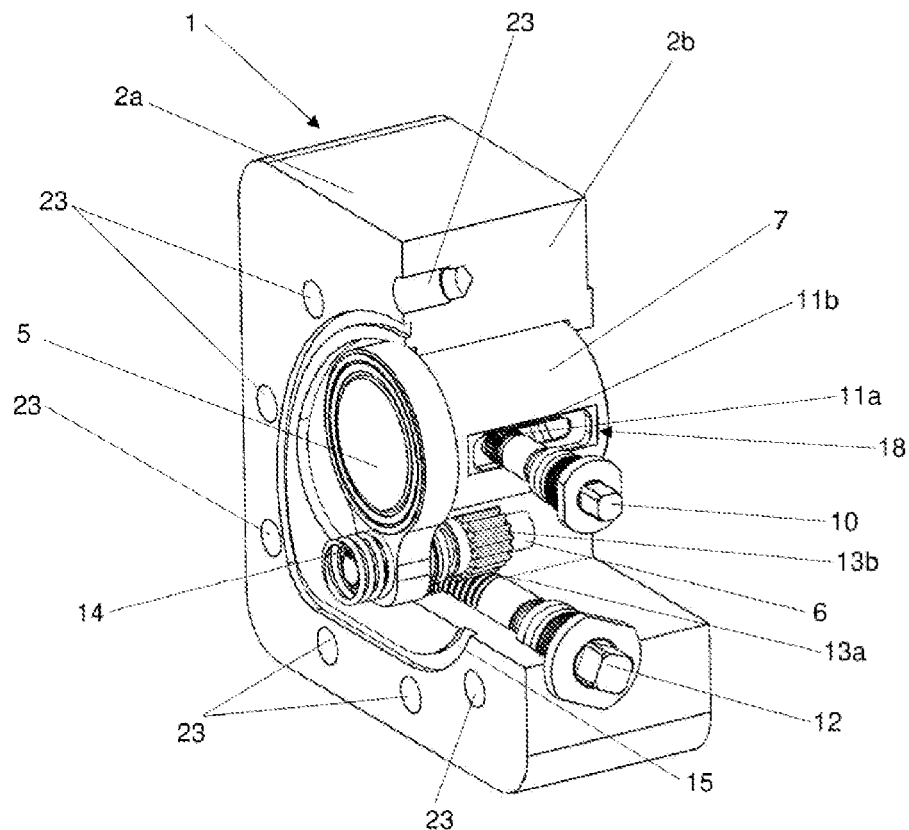
FIG. 9 shows a sectioned perspective view of the front of the valve object of invention, when the shutter element is in a closed position and the tubular element in a working position in contact with a surface of the shutter element to ensure the blockage of fluid flow passage, for the same example of embodiment of the previous figures. For clarity reasons, the first portion of the valve body has not been represented in FIG. 9.
Figure 10:
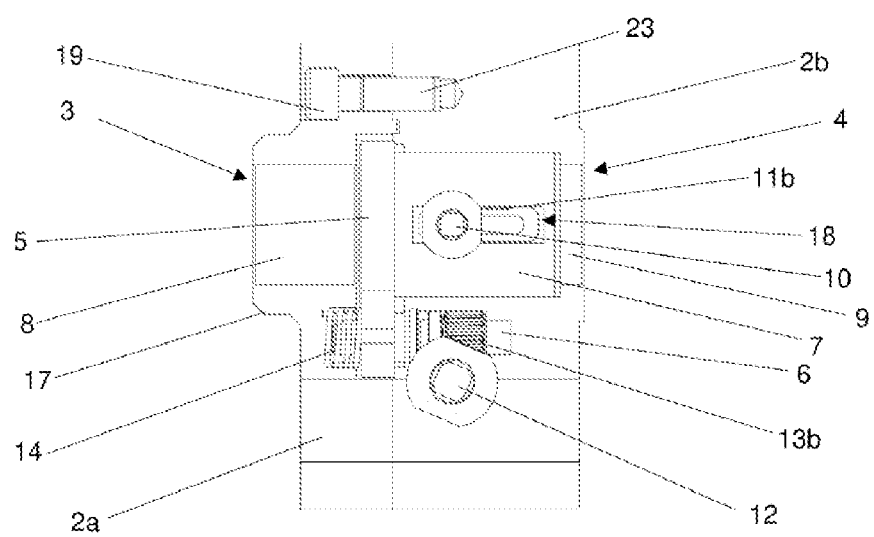
FIG. 10 shows a sectioned view of the valve object of invention, when the shutter element is in a closed position and the tubular element in a working position in contact with a surface of the shutter element to ensure the blockage of fluid flow passage, for the same example of embodiment of the previous figures.

A preferred first embodiment of pivot valve 1 is described below by reference to FIGS. 1 to 11.

In this first embodiment, the fluid flow that circulates through the valve is a hydrocarbon in a liquid state, specifically oil.

The pivot valve 1 of this invention comprises a body 2a,2b, an inlet hole 3 and an outlet hole 4 for the fluid flow path, a shutter element 5 of the fluid flow path pivotally mounted on a rotating shaft 6 of the body 2a, 2b of the valve 1, and a tubular element 7 to channel the fluid flow path into the body 2a,2b of the valve 1.

The body 2a,2b of the valve is formed by two portions 2a,2b of body, a first portion 2a of body provided with a cavity 8 defining an inlet hole 3, and a second portion 2b of body provided with a cavity 9 defining an outlet hole 4. Inlet hole 3 is intended for the fluid to flow into the valve 1 and outlet hole 4 is intended for the fluid to flow out of the valve 1.

Both portions 2a,2b are connected to each other by means of a plurality of screws 19 arranged in threaded holes 20 that cross the first portion 2a of the valve body and coincide with blind threaded holes 23 located in the second portion 2b of the valve body.

The first embodiment described, the second 2b body portion is provided with a groove 15 on an inner wall surface in such a way that it defines a cavity to house an element 16 that ensures the tightness of the body 2a, 2b. Likewise, the first portion 2a of body is on an inner wall of a protrusion 21 coinciding with the groove 15 on the inner wall of the second portion 2b of the body. In this way, the element 16 that guarantees the tightness of the body 2a,2b that remains captive between the groove 15 and the protrusion 21, avoiding the leakage of the fluid to the outside of the valve 1 in an efficient way.

FIG. 1 shows how the first and second portion 2a,2b of the body form a bucket-shaped valve 1 with rounded corners so that the inside of the body 2a,2b is used to the maximum to house all the elements, thus providing a compact valve 1 with reduced dimensions.

The valve 1 comprises within body 2a,2b a shutter element 5 of the fluid flow path which is mounted on a rotating shaft 6, in such a way that it pivots from an open position in which fluid flow is allowed to flow to a shut-off position in which fluid flow is prevented. A control box (not shown) governs the displacements of the shutter element 5 by means of means of displacement which have a rotating shaft 6 mounted inside the body 2a,2b and a second rotating actuating element 12.

The second actuating element 12 has a screw 13a associated with a gear 13b located on the rotating shaft 6, in such a way that it transmits the rotary movement to the shutter element 5, which moves by rotation from an open position to a closed position, or vice versa. In the first embodiment described, the second actuating element 12 is located perpendicular to the rotating shaft 6, forming the screw 13a and the gear 13b an endless screw that transmits the rotary movement of the second actuating element 12 to the shutter element 5. In addition, in this first embodiment, the rotating shaft 6 includes in one of its ends a spring 14 that can be compressed by the shutter element 5 when the tubular element 7 moves to a working position to contact with the shutter element 5. In this situation, the tubular element 7 presses the shutter element 5, so that the latter in turn compresses the spring 14. In the same way, when the tubular element 7 to channel the fluid flow stops exerting pressure on the shutter element 5, it moves linearly on the rotating shaft 6 away from an interior wall of the first portion 2a of the body.

Body 2a,2b also includes inside a tubular element 7 to channel the flow of fluid mounted in such a way that it can move linearly from a resting position in which it is housed in cavity 9 of the second portion 2b of the body, to the inlet hole 3 in a working position in which it comes into contact with the first portion 2a of the body. In the same way, the tubular element 7 to channel the fluid flow can be moved from a resting position to a working position in which it comes into contact with the shutter element 5 in a closed position to block the fluid flow. A control box (not shown) governs the displacements of tubular element 7 by means of actuating means including a first rotary actuating element 10, a gear 11a associated with this first actuating element 10 and a rack 11b arranged in the tubular element 7.

In the first embodiment described, the first actuating element 10 rotary is actuated from outside the body 2a,2b of the valve 1. In addition, this element is associated with a gear 11a and the rack 11b is arranged in a guide groove 18 provided on the surface of the tubular element 7 in such a way that a portion of the length of said element is extended. When turning the first actuating element 10, the teeth of gear unit 11a engage with the teeth of rack 11b and linearly move the tubular element 7 to the desired position. These means of operation allow the tubular element 7 to be held in the desired position without being displaced by the flow of fluid and the forces exerted by it.

Optionally, groove 18 located in tubular element 7, has a groove or protrusion along this groove 18 to ensure the linear movement of tubular element 7 inside the body 2a,2b of the valve 1. In the same way, this indentation or protrusion can also be located on an opposite surface of the tubular element 7 for greater efficiency in guiding the displacement of this tubular element 7.

In the first embodiment described, the outer wall of the first portion 2a of the body has an outer pipe section 17 to couple a flange (not represented) by means of, for example, welding. In a non-represented alternative embodiment, this outer section 17 may be arranged on the outer wall of the second portion 2b of body or on both portions 2a,2b of body to couple in both portions 2a,2b flanges (not represented).

Figure 11:
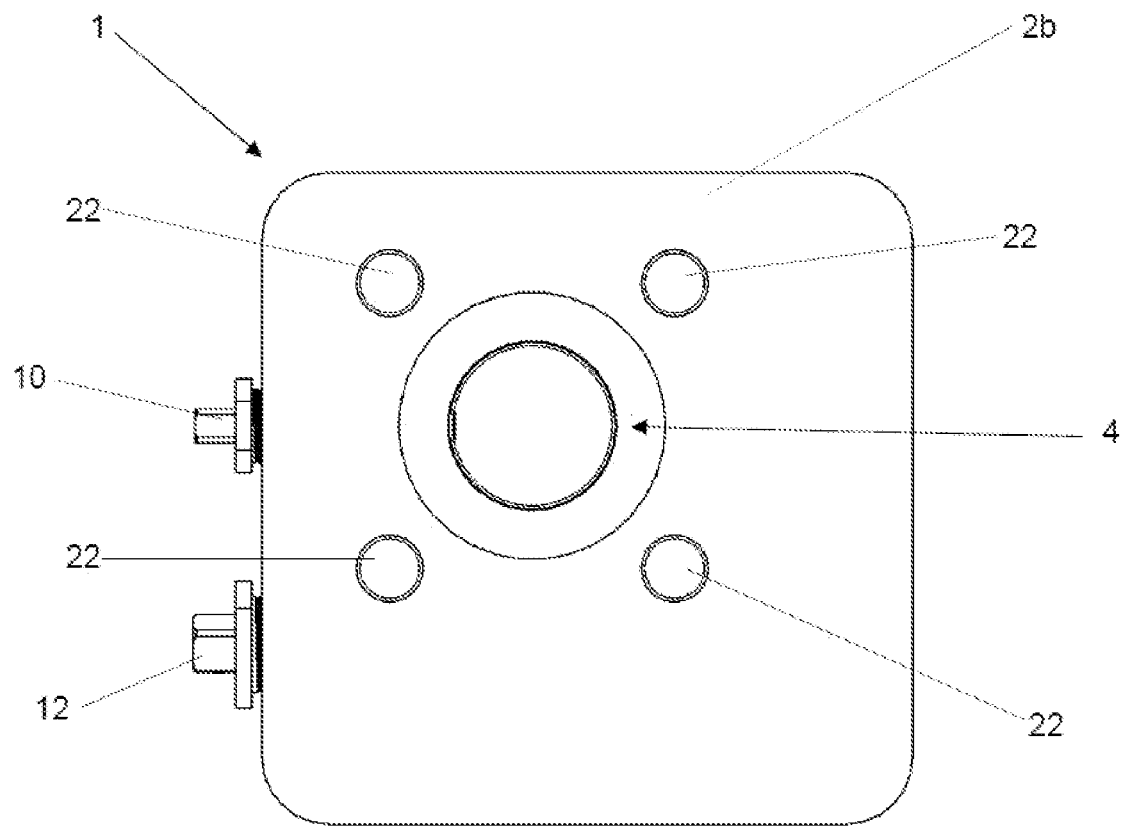
FIG. 11 shows an elevated view of the rear of the valve object of invention, for the same example of embodiment of the previous figures.

FIG. 11 shows how the outer wall of the second portion 2b of the body is provided with holes 22 for coupling valve 1 to a pipe (not shown) of an installation or to a flange (not shown). In a non-represented alternative embodiment, such holes 22 may be arranged either on an outer wall of the first portion 2a of the body, or on an outer wall of the second portion 2b of the body, or on both walls of the first and second portion 2a,2b of the valve 1 body.

The procedure for regulating the flow of a fluid by means of a valve 1 of the first embodiment described is described below, according to FIGS. 1 to 11.

In a first stage, the control box (not shown) sends a signal to drive the first rotary actuating element 10 so that it rotates the gear 11a which is associated with the rack 11b arranged in the groove 18 on the surface of the tubular element 7. In this way, the teeth of gear 11a come into contact with the teeth of rack 11b by moving the tubular element 7 fluid flow channel from a working position in which the shutter element 5 presses when in a closed position to a position in which it is housed in the cavity 9 of the second portion 2b of the body of the valve 1.

At the same time, the spring 14 longitudinally displaces the shutter element 5 by separating it from an inner surface of the first portion 2a of the body of the valve. In this way, the shutter element does not come into contact with the said internal surface, preventing friction between said shutter element 5 and said internal surface in later stages.

At a later stage, the control box (not shown) sends a signal to actuate the first rotary actuating element 12 so that it rotates the screw 13a which is associated with the gear 13b on the rotating axis 6. In this way, the rotating axis 6 is rotated on that on which the shutter element 5 is located, which moves longitudinally and rotationally from a closed position to an open position to allow fluid to flow through the interior of the valve 1.

The control box (not shown) then sends a signal to actuate the first rotary actuating element 10 by moving the tubular element 7 fluid flow channel from a resting position in which it is housed in the cavity 9 of the second portion 2b of the body to a working position in which it comes into contact with the first portion 2a of the body.

The tubular element 7 fluid flow channel is held in this position for a certain time to allow the flow of fluid through it from the inlet hole 3 to the outlet hole 4. When it is desired to interrupt the flow again, the control box (not shown) sends a signal to actuate the first actuating rotary element 10 to move the element 7 linearly from a working position in which the tubular element 7 comes into contacts with the first portion 2a of the body to a resting position in which it is housed in the cavity 9 of the second portion 2b.

Subsequently, in valve 1, a displacement of the shutter element 5 takes place when the control box (not represented) sends a signal to the second actuator element 12 which, in turn, transmits a rotary motion to the rotating axis 6 on which the shutter element 5 is arranged, in such a way that it moves from an open position to a closed position to prevent the flow of fluid from flowing through the valve 1.

Finally, the tubular element 7 moves linearly from a resting position to a working position in which it comes into contact with the shutter element 5 by pressing it against a wall of the first portion 2a of the body and in turn pressing the spring 14.

A second embodiment of the pivot valve 1 is described below, referring to FIGS. 12 to 18.

In this second embodiment, the fluid flow through the valve is a liquid hydrocarbon, specifically oil.

The pivot valve 1 of this second embodiment comprises a body 2a,2b, an inlet hole 3 and an outlet hole 4 for the fluid flow path, a shutter element 5 of the fluid flow path pivotally mounted on a rotating shaft 6 of the body 2a, 2b of the valve 1, and a tubular element 7 to channel the fluid flow path through the body 2a,2b of the valve 1.

The body 2a,2b of the valve 1 is formed by two portions 2a,2b of body, a first portion 2a of body provided with a cavity 8 defining an inlet hole 3, and a second portion 2b of body provided with a cavity 9 defining an outlet hole 4. Inlet hole 3 is intended for the fluid to flow into the valve 1 and outlet hole 4 is intended for the fluid to flow out of the valve 1.

Both portions 2a,2b are connected to each other by means of a plurality of screws 19 arranged in threaded holes 20 that cross the first portion 2a of the valve body and coincide with blind threaded holes 23 located in the second portion 2b of the valve body.

In this second embodiment described, the second portion 2b of body is provided with a groove 15 on an inner wall surface in such a way that it defines a cavity to house an element 16 that ensures the tightness of the body 2a, 2b. Likewise, the first portion 2a of body is on an inner wall of a protrusion 21 coinciding with the groove 15 on the inner wall of the second portion 2b of the body. In this way, the element 16 that guarantees the tightness of the body 2a,2b that remains captive between the groove 15 and the protrusion 21, avoiding the leakage of the fluid to the outside of the valve 1 in an efficient way.

Figure 12:
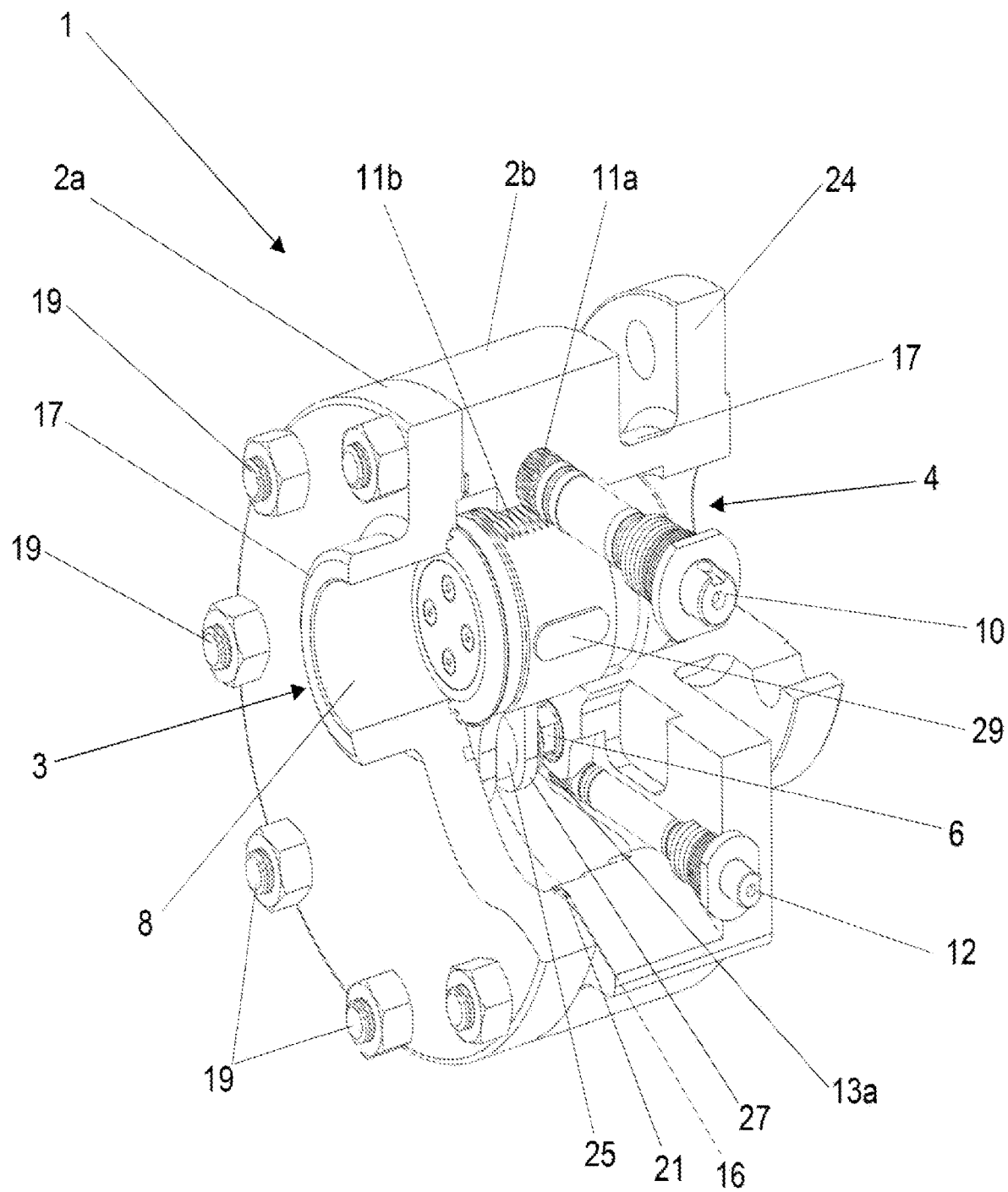
FIG. 12 shows a sectioned perspective view of the valve object of invention when, the shutter element is in a closed position and the tubular element is in a working position where it contacts with a surface of the shutter element, for the same a second example of embodiment.
Figure 13:
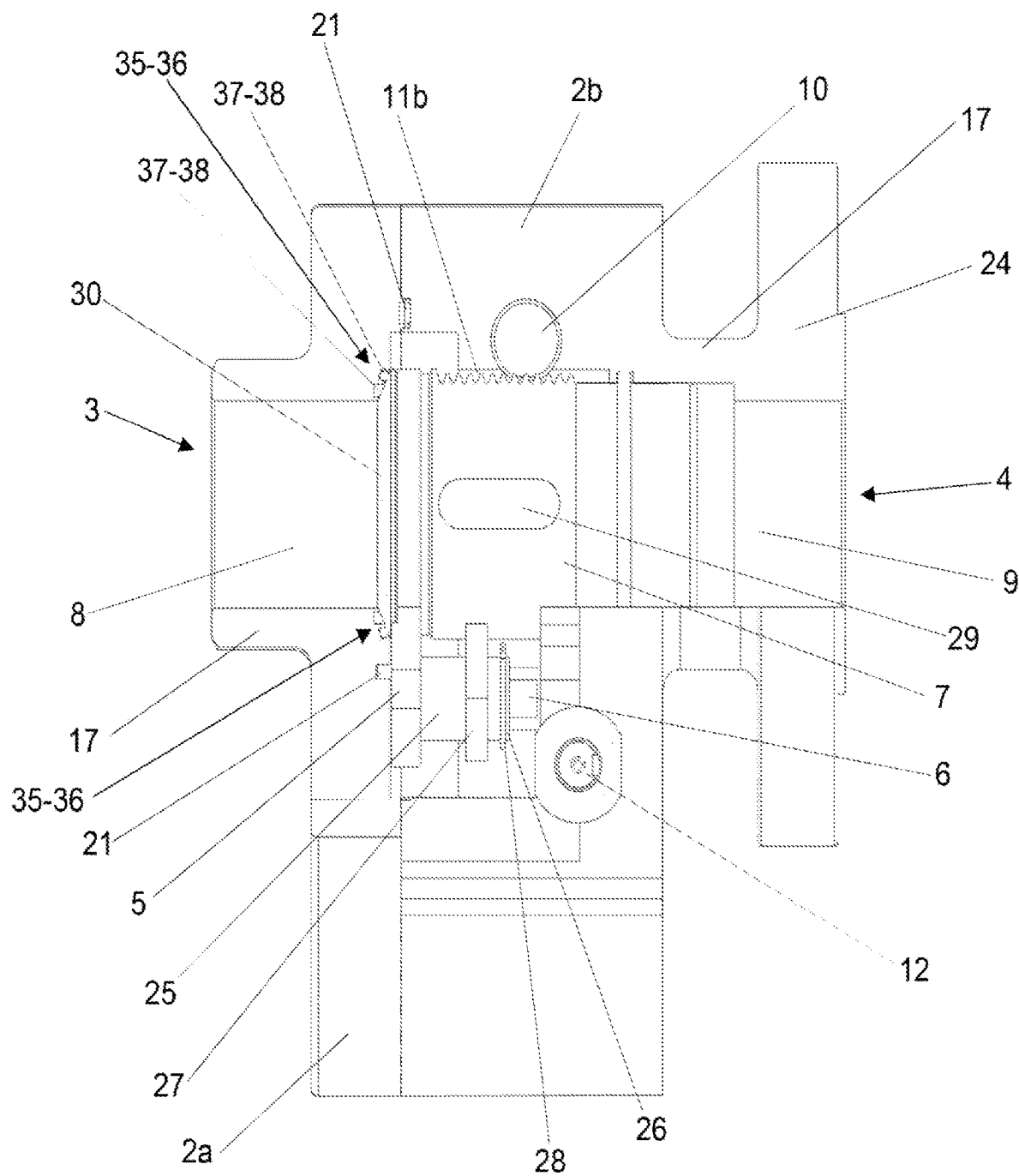
FIG. 13 shows a lateral perspective sectioned view of the valve object of invention when, the shutter element is in a closed position and the tubular element is in a working position where it contacts a surface of the shutter element, for the same example of embodiment of FIG. 12.
Figure 14:
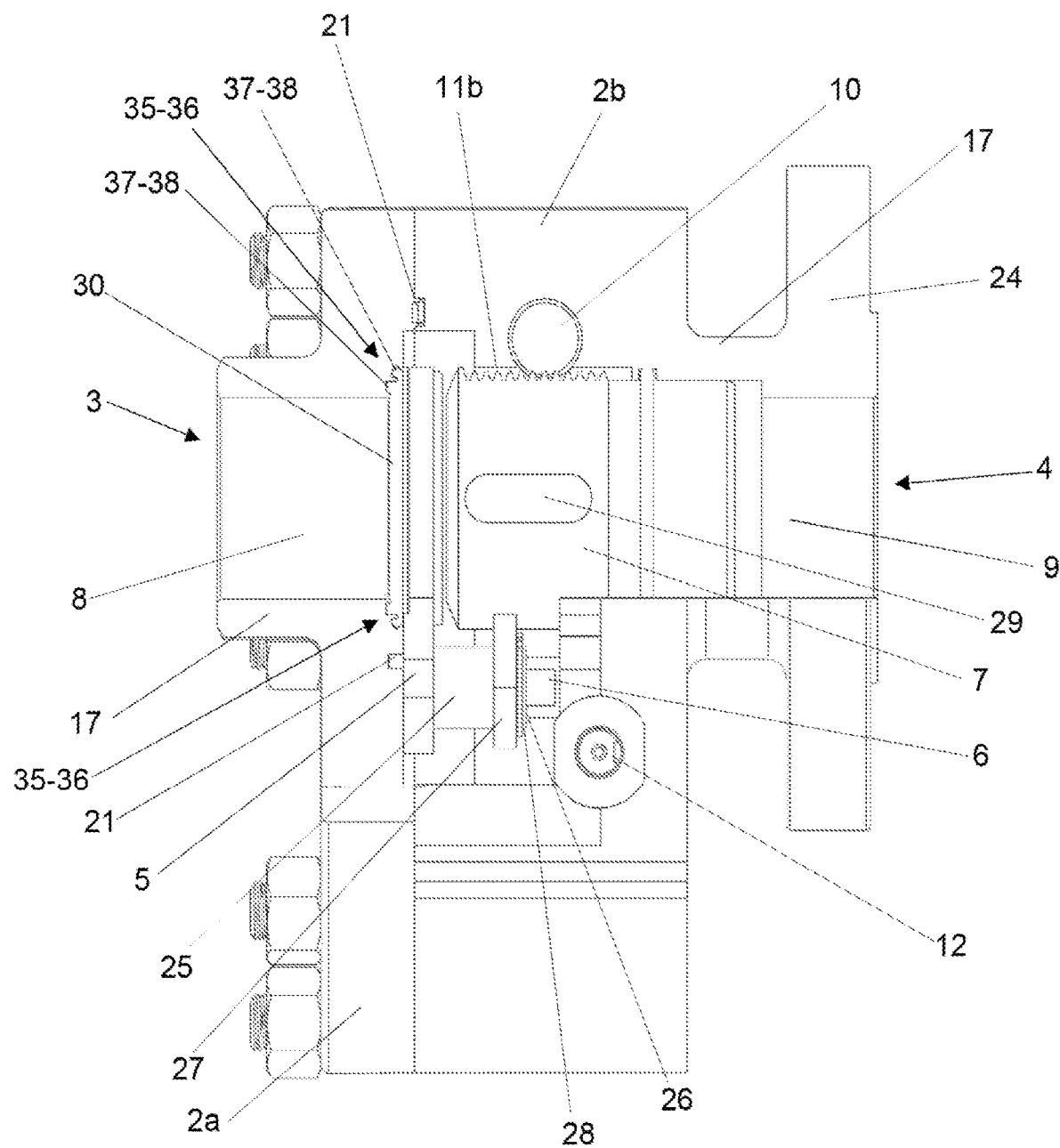
FIG. 14 shows a sectioned lateral perspective view of the valve object of invention, when the shutter element is in a closed position and the tubular element is in a resting position, for the same example of embodiment of FIG. 12.
Figure 15:
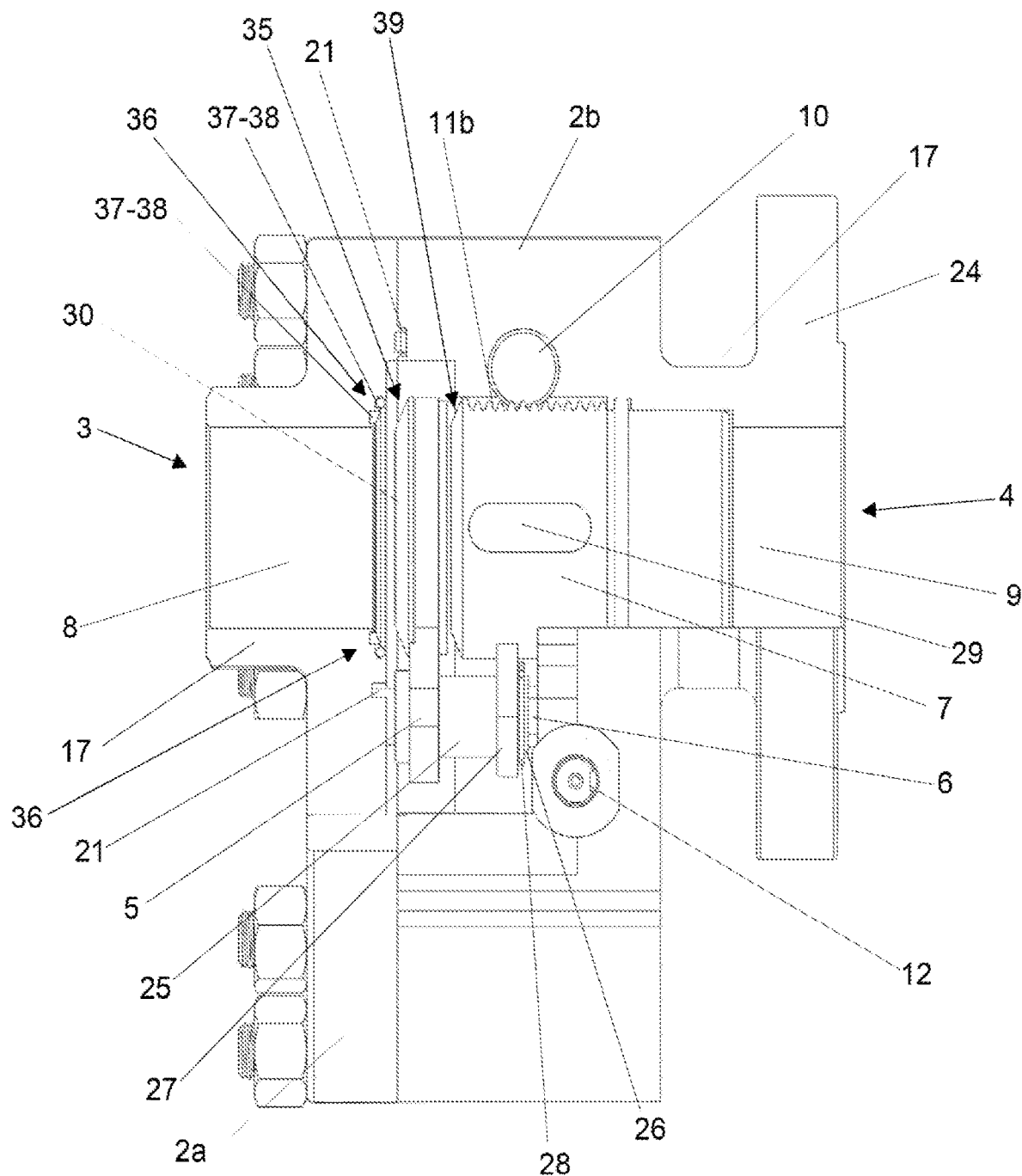
FIG. 15 shows a sectioned lateral perspective view of the valve object of invention, when the shutter element is in an intermediate position and the tubular element is in a resting position, for the same example of embodiment of FIG. 12.
Figure 16:
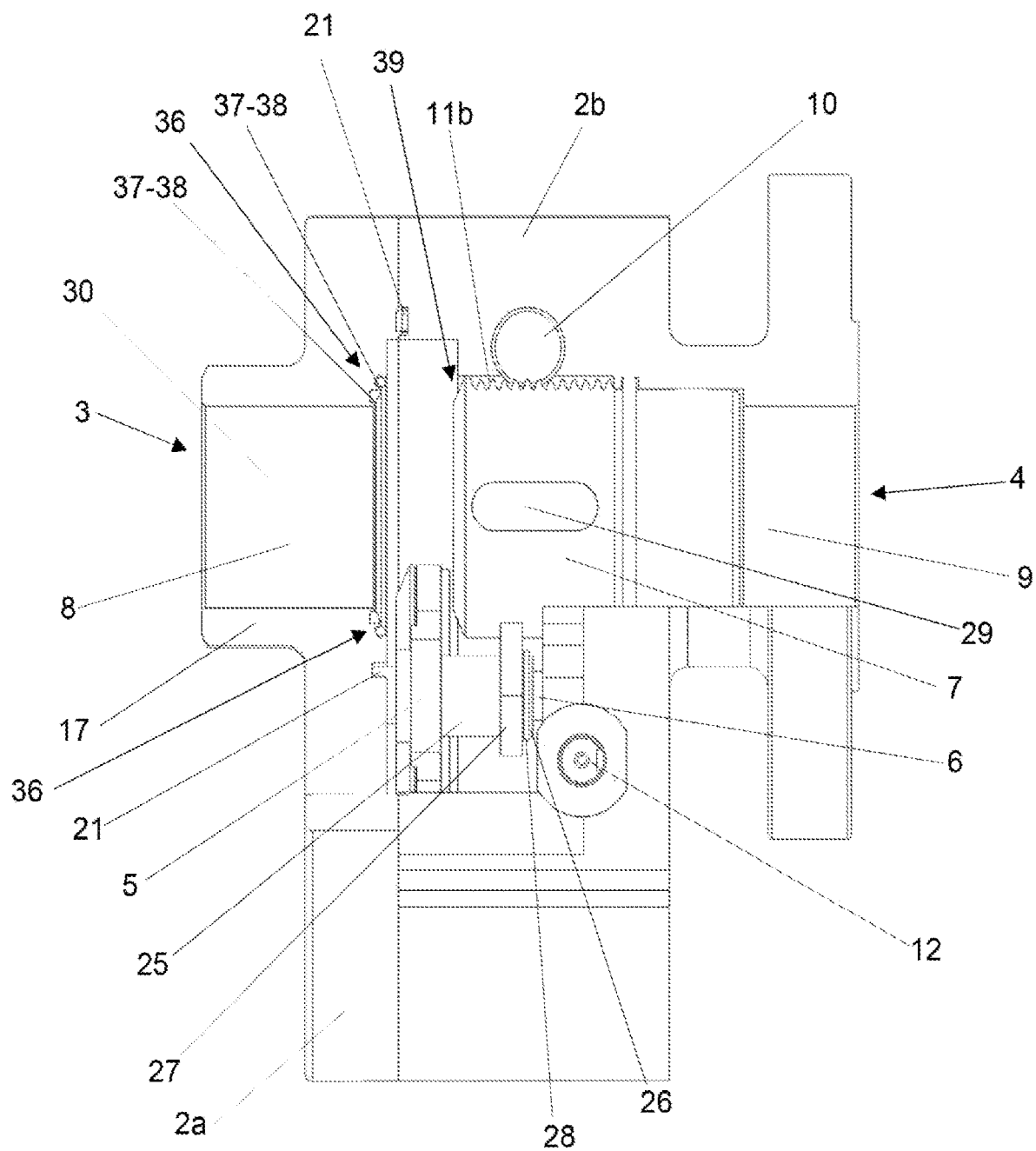
FIG. 16 shows a sectioned lateral perspective view of the valve object of invention, when the shutter element is in an open position and the tubular element in a resting position, for the same example of embodiment of FIG. 12.
Figure 17:
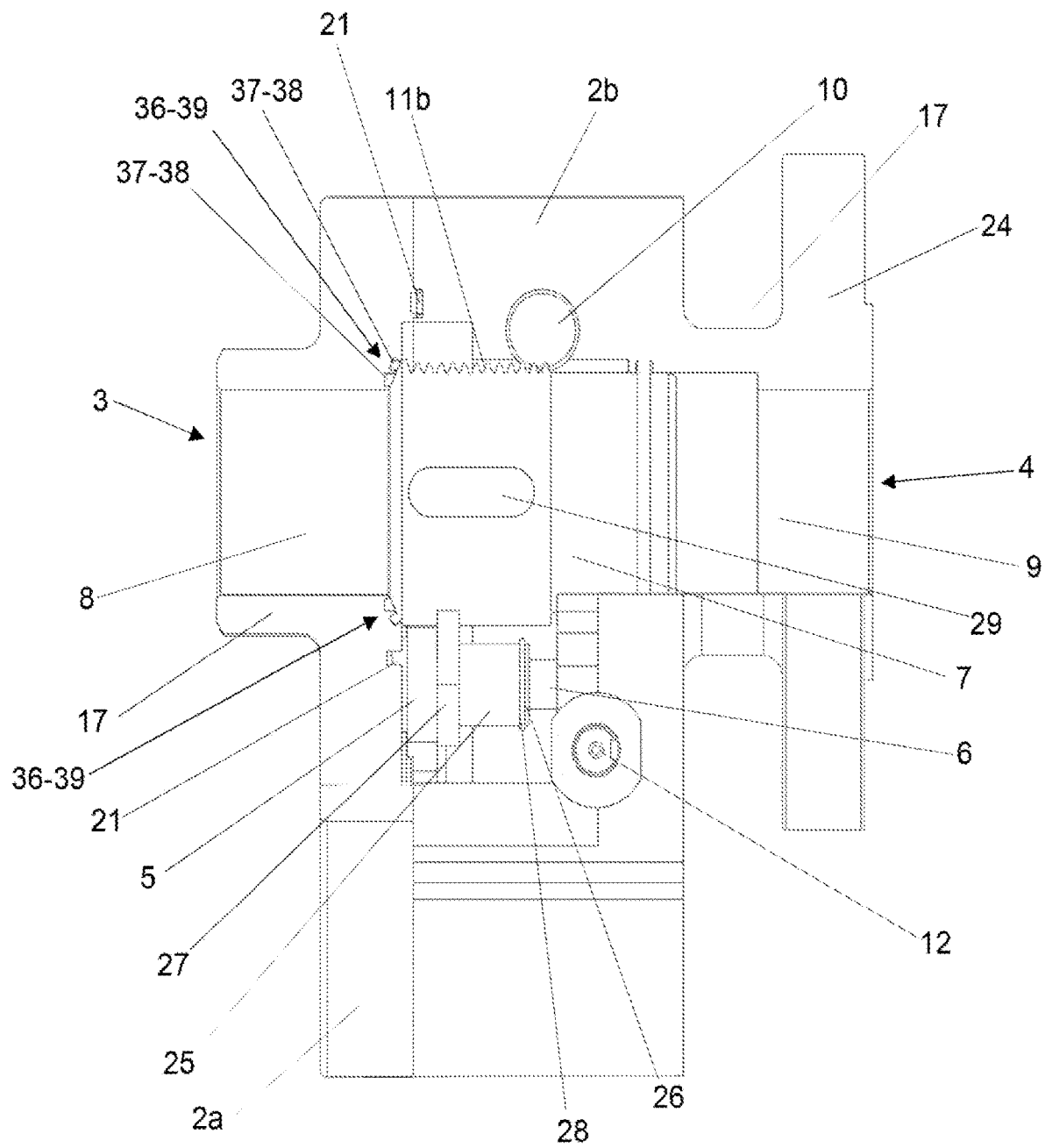
FIG. 17 shows a sectioned lateral perspective view of the valve object of invention, when the shutter element is in an open position and the tubular element in a working position in contact with a surface of the first portion of the valve body, for the same example of embodiment of FIG. 12.
Figure 18:
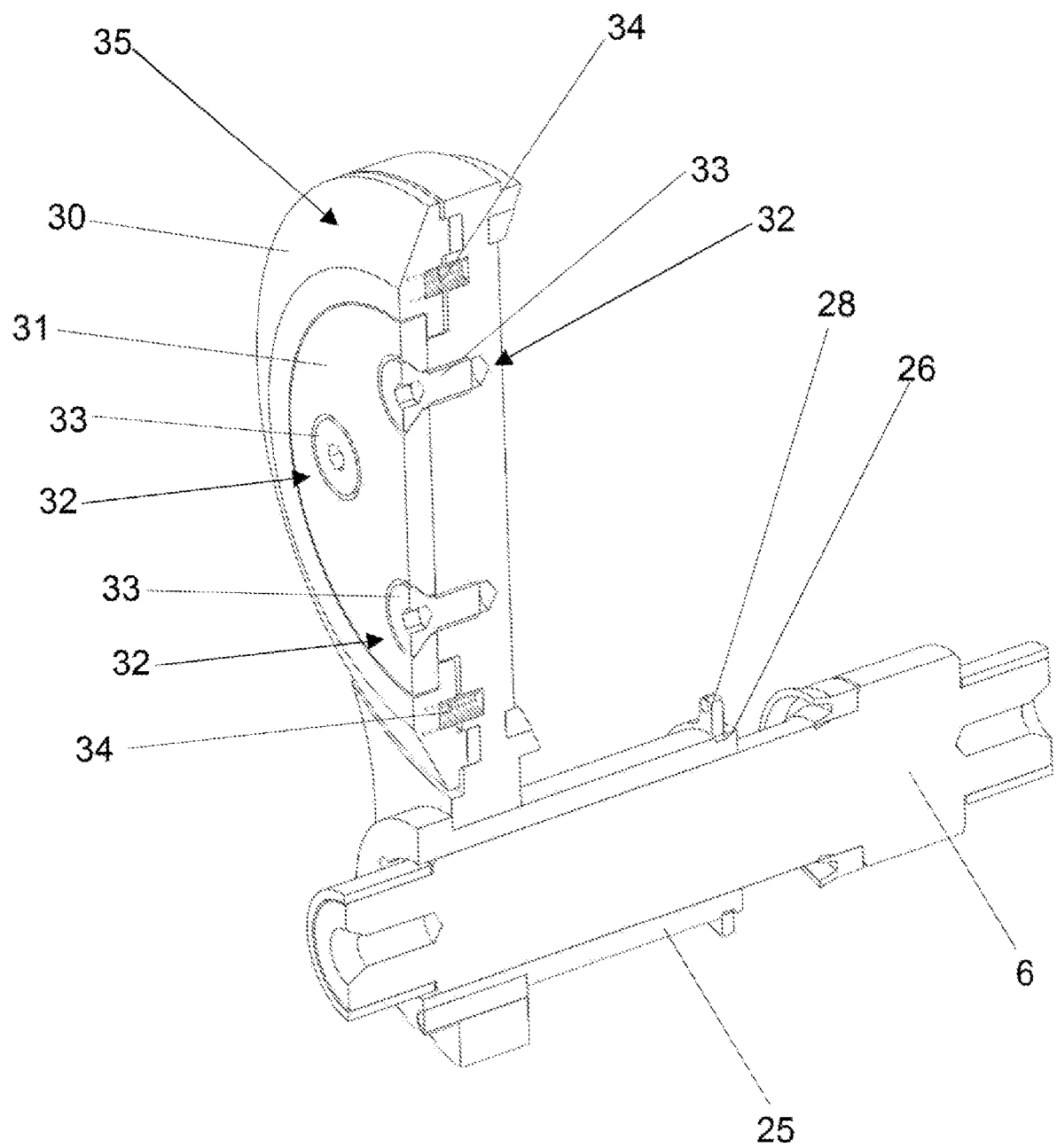
FIG. 18 shows a sectioned view of the shutter element including the centring mechanism, for the same example of embodiment as FIG. 12.

FIG. 12 shows how the first and second portion 2a,2b of the body form a cylinder-shaped valve 1 in such a way that the inside of the body 2a,2b is used to the maximum to house all the elements, thus providing a compact valve 1 with reduced dimensions.

In addition, in this second embodiment, the second portion 2b of body comprises a flange 24 joined at the rear. This flange 24 includes through holes to be coupled to a pipe section of a fluid installation.

The valve 1 comprises a shutter element 5 of the fluid flow path inside body 2a,2b, which is mounted in conjunction with a dragging sleeve 25 arranged concentrically to a rotating shaft 6, in such a way that it pivots from an open position in which the fluid flow is allowed to pass to a closed position in which the fluid flow is prevented. A control box (not shown) governs the displacements of the shutter element 5 by means of means of displacement including a rotating shaft 6 mounted inside body 2a,2b and a second rotating actuating element 12.

The second actuating element 12 has a screw 13a associated with a gear 13b located on the rotating shaft 6, in such a way that it transmits the rotary movement to the shutter element 5, which moves by rotation from an open position to a closed position, or vice versa. In the second embodiment described, the second actuating element 12 is located perpendicular to the rotating shaft 6 forming the screw 13a and the gear 13b a mechanism that transmits the rotary movement of the second actuating element 12 to the shutter element 5. In addition, in this second embodiment, the rotating shaft 6 includes in the dragging sleeve 25 with a 26 protrusion that extends radially arranged to come into contact with a joining portion 27 to this tubular element 7. The dragging sleeve 25 moves linearly on the rotating shaft 6 when a first actuator 10 drives the tubular element 7 from a working position to a resting position. In this way, the shutter element 5 moves linearly when the tubular element 7 comes into contact with this protrusion 26 of the dragging sleeve 25 when moving from the working position to the rest position. During the linear displacement of the tubular element 7 from the working position to the rest position, the dragging sleeve 25 accumulates potential energy in an elastic element 28, which is released for the linear displacement of this when the tubular element 7 moves from a rest position to a working position.

Body 2a,2b also includes inside a tubular element 7 to channel the flow of fluid mounted in such a way that it can move linearly from a resting position in which it is housed in cavity 9 of the second portion 2b of the body, to the inlet hole 3 in a working position in which it comes into contact with the first portion 2a of the body. In the same way, the tubular element 7 to channel the fluid flow can be moved from a resting position to a working position in which it comes into contact with the shutter element 5 in a closed position to block the fluid flow. A control box (not shown) governs the displacements of tubular element 7 by means of actuating means including a first rotary actuating element 10, a gear 11a associated with this first actuating element 10 and a rack 11b arranged on an external surface of tubular element 7.

In the second embodiment described, the first actuating element 10 rotary is actuated from outside the body 2a,2b of the valve 1. When turning the first actuating element 10, the teeth of gear unit 11a engage with the teeth of rack 11b and linearly move the tubular element 7 to the desired position. These means of operation allow the tubular element 7 to be held in the desired position without being displaced by the flow of fluid and the forces exerted by it.

In this second embodiment, the tubular element 7 has two guiding elements 29 arranged opposite each other on the outer surface of the tubular element. These guiding elements 29 are complementary to channellings arranged in the cavity 9 of the second portion 2b of the body. In this way, the linear displacement of the tubular element 7 is guided more effectively.

According to this second embodiment, the shutter element 5 comprises a centring mechanism on an outer surface of the shutter element 5. The centring mechanism includes a positioning disk 30 fixed to the shutter element 5 by means of a plate 31 with holes 32 for inserting screws 33, in such a way that the positioning disk 30 is mounted to the shutter element 5. In addition, the centring mechanism includes elastic elements 34 mounted at one distal end to the shutter element 5 and at the distal end opposite positioning disk 30. These elastic elements 34 allow the positioning disk 30 to be moved over the plane defined by the surface of the shutter element 5 in such a way that the positioning disk 30 comes into contact with the first portion 2a of the body, obstructing the flow of fluid.

The positioning disk 30 comprises a contact surface 35 which is inclined with respect to the plane created by the surface of the shutter element. In the same way, the first portion 2a of the body comprises a complementary contact surface 36 which is complemented with said contact surface 35 of the positioning disk 30. In addition, the complementary contact surface 36 of the first portion 2a of the body comprises two grooves 37 in which a sealing gasket 38 is housed in each of them. In this way, when the shutter element 5 is in a closed position, and the tubular element 7 in a working position, the shutter element 5 the contact surface 35 of the positioning disk 30 comes into contact with the complementary contact surface 36 of the first portion 2a of the body and the sealing gaskets 38 preventing fluid leaks from the inlet hole 3 to the outlet hole 4, or vice versa.

In addition, in the second embodiment described, the tubular element 7 also comprises a 39 contact surface that is inclined. This contact surface 39 is intended to come into contact with the complementary contact surface 36 of the first portion 2a of body. Thus, when the shutter element 5 is in an open position and the tubular element 7 in a working position, the contact surface 39 of the tubular element 7 comes into contact with the complementary contact surface 36 of the first portion 2a of the body and the sealing gaskets 38 preventing fluid leaks inside the valve 1.

In the second embodiment described, the outer wall of the first portion 2a of the body has an outer pipe section 17 to attach a flange (not represented) by means, for example, welding. In this second embodiment, the outer wall of the second portion 2b of the body comprises this outer section 17 where a 24 flange is mounted by welding.

The procedure for regulating the flow of a fluid by means of a valve 1 of the second embodiment described is described below, according to FIGS. 12 to 18.

In a first stage, the control box (not shown) sends a signal to drive the first rotary actuating element 10 in such a way that it rotates the gear 11a which is associated with the rack 11b located on the outer surface of the tubular element 7. In this way, the teeth of gear 11a come into contact with the teeth of rack 11b by moving the tubular element 7 fluid flow channel from a working position in which the shutter element 5 presses when in a closed position to a position in which it is housed in the cavity 9 of the second portion 2b of the valve 1 body.

At the same time, a portion 27 of the tubular element 7 in contact with the dragging sleeve 25 comes into contact with the protrusion 26 of the dragging sleeve 25, linearly displacing in turn the shutter element 5, separating it from an interior surface of the first portion 2a of the valve body. In this way, the shutter element 5 does not come into contact with the said inner surface, preventing friction between said shutter element 5 and said inner surface in later stages.

At a later stage, the control box (not shown) sends a signal to actuate the first rotary actuating element 12 so that it rotates the screw 13a which is associated with the gear 13b on the rotating shaft 6. In this way, the rotating shaft 6 on which the driving bush 25 is mounted is rotated, and on which the shutter element 5 is arranged. Rotating shaft axis 6 moves the shutter element 5 from a closed position to an open position to allow fluid to flow into the valve 1.

The control box (not shown) then sends a signal to actuate the first rotary actuating element 10 by moving the tubular element 7 fluid flow channel from a resting position in which it is housed in the cavity 9 of the second portion 2b of the body to a working position in which it comes into contact with the first portion 2a of the body.

The tubular element 7 fluid flow channel is held in this position for a certain time to allow the flow of fluid through it from the inlet hole 3 to the outlet hole 4. When it is desired to interrupt the flow again, the control box (not shown) sends a signal to actuate the first actuating rotary element 10 to move the element 7 linearly from a working position in which the tubular element 7 comes into contacts with the first portion 2a of the body to a resting position in which it is housed in the cavity 9 of the second portion 2b.

Subsequently, in valve 1, a displacement of the shutter element 5 takes place when the control box (not represented) sends a signal to the second actuator element 12 which, in turn, transmits a rotary motion to the rotating shaft 6 on which the shutter element 5 is arranged, in such a way that it moves from an open position to a closed position to prevent the flow of fluid from flowing through the valve 1.

Finally, the tubular element 7 moves linearly from a resting position to a working position in which it comes into contact with the shutter element 5 by pressing it against a wall of the first portion 2a of the body.

Although reference has been made to two specific embodiments of the invention, it is clear to a person skilled in the art that the valve and procedures described are susceptible to numerous variations and modifications, and that all the details mentioned can be replaced by other technically equivalent ones, without departing from the scope of protection defined by the attached claims. For example, although it has been described that the fluid circulating inside the valve is a hydrocarbon, specifically petroleum, it could also be, for example, water, oil, gasoline, diesel, kerosene, pentane, hexane, heptane, cyclohexane, methylcyclohexane, natural gas, methane, propane, butane, ethylene, propylene, butylene, butadiene or ethanol.

What is claimed is:

1. A pivoting valve to regulate the flow of a fluid comprising a body that includes;
    an inlet hole and an outlet hole for the fluid flow path,
    a shutter element of the fluid flow path mounted pivotable on a rotating shaft of the valve body to be able to rotate from an open position to a closed position of the fluid flow path,
    a tubular element to channel the flow of fluid inside the body of the valve, the tubular element being located between the inlet hole and the outlet hole, and mounted linearly, so that it can be moved from the outlet hole to the inlet hole when the shutter element is in an open position,
    means to actuate the displacement of the tubular element inside the body, comprising a mechanism provided with a first actuating element capable of being actuated from the outside of that body, the mechanism including a means of transmitting the movement of that first actuating element to the tubular element that is housed inside the body; and
    means of displacement of the shutter element including a second actuator element and a mechanism provided in the second actuator element capable of being operated from outside the body of the valve and means of transmitting the movement of said second actuator element to the rotating axis of the shutter element, wherein the second actuating element is rotary and these transmission means include a screw associated with the second actuating element and a gear attached to the rotating shaft, the shutter element being able to be displaced when the said screw is actuated.

2. The pivoting valve according to claim 1, where such means of displacement include a spring at one end of the rotating shaft capable of being pressed against a surface of the first portion of the valve body, when said tubular element is located in a working position, the same spring being capable of linearly displacing the shutter element on the rotating shaft when the pressure of the tubular element ceases.

3. The pivoting valve according to claim 1, in which these means of displacement include a dragging sleeve arranged concentric and supportive to the rotating axis,
    where the shutter element is mounted next to the dragging sleeve and is capable of displacing the shutter element when the second actuating element is actuated, and where the tubular element is mounted linearly displaceable with respect to the dragging sleeve, and the tubular element is susceptible to being displaced when the first actuating element is actuated.

4. The pivoting valve according to claim 3, where the dragging sleeve includes a protrusion intended to contact a portion of the union of the tubular element when the first actuating element is actuated, where said protrusion is configured to cooperate with an elastic element to linearly displace said shutter element by linearly displacing the tubular element from a working position in which it comes into contact with the first portion of the body or with the shutter element when it is in a fluid flow shut-off position, to a resting position in which it is housed in cavity of the second portion of the body.

5. A pivoting valve to regulate the flow of a fluid comprising a body that includes;
    an inlet hole and an outlet hole for the fluid flow path,
    a shutter element of the fluid flow path mounted pivotable on a rotating shaft of the valve body to be able to rotate from an open position to a closed position of the fluid flow path, a tubular element to channel the flow of fluid inside the body of the valve, the tubular element being located between the inlet hole and the outlet hole, and mounted linearly, so that it can be moved from the outlet hole to the inlet hole when the shutter element is in an open position;

means to actuate the displacement of the tubular element inside the body, comprising a mechanism provided with a first actuating element capable of being actuated from the outside of that body, the mechanism including a means of transmitting the movement of that first actuating element to the tubular element that is housed inside the body; wherein said body includes a first portion of body provided with a cavity defining the inlet hole, a second portion of body provided with a cavity defining an outlet hole, wherein the tubular element to channel the flow of fluid mounted linearly displaceable within said body from a resting position in which it is housed in the cavity of the second portion of the body to a working position in which it comes into contact with the first portion of the body when the shutter element is in an open position;

means of displacement of the shutter element including a second actuator element and a mechanism provided in the second actuator element capable of being operated from outside the body of the valve and means of transmitting the movement of said second actuator element to the rotating axis of the shutter element, wherein the second actuating element is rotary and these transmission means include a screw associated with the second actuating element and a gear attached to the rotating shaft, the shutter element being able to be displaced when the said screw is actuated.

6. The pivoting valve according to claim 5, where such means of displacement include a spring at one end of the rotating shaft capable of being pressed against a surface of the first portion of the valve body, when said tubular element is located in a working position, the same spring being capable of linearly displacing the shutter element on the rotating shaft when the pressure of the tubular element ceases.

7. The pivoting valve according to claim 5, in which these means of displacement include a dragging sleeve arranged concentric and supportive to the rotating axis, where the shutter element is mounted next to the dragging sleeve and is capable of displacing the shutter element when the second actuating element is actuated, and where the tubular element is mounted linearly displaceable with respect to the dragging sleeve, and the tubular element is susceptible to being displaced when the first actuating element is actuated.

8. The pivoting valve according to claim 7, where the dragging sleeve includes a protrusion intended to contact a portion of the union of the tubular element when the first actuating element is actuated, where said protrusion is configured to cooperate with an elastic element to linearly displace said shutter element by linearly displacing the tubular element from a working position in which it comes into contact with the first portion of the body or with the shutter element when it is in a fluid flow shut-off position, to a resting position in which it is housed in cavity of the second portion of the body.

9. A pivoting valve to regulate the flow of a fluid comprising a body that includes;
an inlet hole and an outlet hole for the fluid flow path,
a shutter element of the fluid flow path mounted pivotable on a rotating shaft of the valve body to be able to rotate from an open position to a closed position of the fluid flow path,
a tubular element to channel the flow of fluid inside the body of the valve, the tubular element being located between the inlet hole and the outlet hole, and mounted linearly, so that it can be moved from the outlet hole to the inlet hole when the shutter element is in an open position.
means to actuate the displacement of the tubular element inside the body, comprising a mechanism provided with a first actuating element capable of being actuated from the outside of that body, the mechanism including a means of transmitting the movement of that first actuating element to the tubular element that is housed inside the body
wherein said first actuating element is rotary and said transmission means include a gear associated to said first actuating element and to a rack joined to the tubular element, said tubular element being susceptible to being displaced when said gear is actuated.

10. The pivoting valve according to claim 9, in which the rack is provided with a groove of guide provided in a surface of the tubular element.

11. The pivoting valve according to claim 9, which also includes means of displacement of the shutter element including a second actuator element and a mechanism provided in the second actuator element capable of being operated from outside the body of the valve and means of transmitting the movement of said second actuator element to the rotating axis of the shutter element.

12. The pivoting valve according to claim 11, in which the second actuating element is rotary and these transmission means include a screw associated with the second actuating element and a gear attached to the rotating shaft, the shutter element being able to be displaced when the said screw is actuated.

13. The pivoting valve according to claim 12, where such means of displacement include a spring at one end of the rotating shaft capable of being pressed against a surface of the first portion of the valve body, when said tubular element is located in a working position, the same spring being capable of linearly displacing the shutter element on the rotating shaft when the pressure of the tubular element ceases.

14. The pivoting valve according to claim 12, in which these means of displacement include a dragging sleeve arranged concentric and supportive to the rotating axis, where the shutter element is mounted next to the dragging sleeve and is capable of displacing the shutter element when the second actuating element is actuated, and where the tubular element is mounted linearly displaceable with respect to the dragging sleeve, and the tubular element is susceptible to being displaced when the first actuating element is actuated.

15. The pivoting valve according to claim 14, where the dragging sleeve includes a protrusion intended to contact a portion of the union of the tubular element when the first actuating element is actuated, where said protrusion is configured to cooperate with an elastic element to linearly displace said shutter element by linearly displacing the tubular element from a working position in which it comes into contact with the first portion of the body or with the shutter element when it is in a fluid flow shut-off position, to a resting position in which it is housed in cavity of the second portion of the body.

\* \* \* \* \*